US010833952B2

(12) United States Patent
Astigarraga et al.

(10) Patent No.: US 10,833,952 B2
(45) Date of Patent: Nov. 10, 2020

(54) INTRODUCING LATENCY AND DELAY FOR TEST OR DEBUG PURPOSES IN A SAN ENVIRONMENT

(71) Applicant: INTERNATIONAL BUSINESS MACHINES CORPORATION, Armonk, NY (US)

(72) Inventors: Tara Astigarraga, Fairmont, NY (US); Louie A. Dickens, Tucson, AZ (US); Michael E. Starling, Honesdale, PA (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 15/405,971

(22) Filed: Jan. 13, 2017

(65) Prior Publication Data

US 2017/0126507 A1 May 4, 2017

Related U.S. Application Data

(63) Continuation of application No. 14/246,673, filed on Apr. 7, 2014, now abandoned.

(51) Int. Cl.
*H04L 12/26* (2006.01)
*H04L 29/08* (2006.01)
*H04L 12/24* (2006.01)
*G06F 17/18* (2006.01)

(52) U.S. Cl.
CPC ............ *H04L 41/142* (2013.01); *G06F 17/18* (2013.01); *H04L 41/145* (2013.01); *H04L 43/50* (2013.01); *H04L 67/1097* (2013.01)

(58) Field of Classification Search
CPC ..... H04L 41/142; H04L 41/145; H04L 43/50; H04L 67/1097
See application file for complete search history.

(56) References Cited

U.S. PATENT DOCUMENTS

| 5,881,237 A * | 3/1999 | Schwaller ............... H04L 43/50 709/224 |
| 6,108,309 A * | 8/2000 | Cohoe ................... H04L 41/145 370/241 |

(Continued)

FOREIGN PATENT DOCUMENTS

EP        1560366        1/2007

OTHER PUBLICATIONS

Kalita, H., et al. "Designing WANem: A Wide Area Network Emulator Tool" IEEE 3rd Int'l Conf. on Communication Sys. & Networks (COMSNETS 2011) available from <https://ieeexplore.ieee.org/abstract/document/5716495> (Year: 2011).*

(Continued)

*Primary Examiner* — Jay Hann
(74) *Attorney, Agent, or Firm* — Teddi Maranzano

(57) ABSTRACT

Simulating latency in a network environment. A device sends a latency request. The device receives a latency support confirmation. The device builds an I/O frame. The I/O frame comprises a latency simulating bit and a latency duration. Based on the latency simulating bit and the latency duration, the device holds the I/O frame. The device sends the I/O frame.

9 Claims, 9 Drawing Sheets

(56) References Cited

U.S. PATENT DOCUMENTS

| | | | | |
|---|---|---|---|---|
| 6,901,357 | B1* | 5/2005 | Patiejunas | H04L 43/50 |
| | | | | 703/14 |
| 6,922,663 | B1 | 7/2005 | Maurer | |
| 7,013,257 | B1* | 3/2006 | Nolan | H04B 17/0087 |
| | | | | 703/2 |
| 7,376,550 | B1* | 5/2008 | Bokaemper | G06F 11/3414 |
| | | | | 703/21 |
| 7,447,622 | B2* | 11/2008 | Arama | H04L 41/145 |
| | | | | 463/42 |
| 7,333,517 | B2 | 12/2008 | Madhavapeddi et al. | |
| 7,478,018 | B1* | 1/2009 | Lavallee | H04L 41/046 |
| | | | | 703/2 |
| 7,593,345 | B2* | 9/2009 | Dube | H04L 41/145 |
| | | | | 370/229 |
| 7,688,740 | B1 | 3/2010 | Jacobson et al. | |
| 8,015,277 | B2* | 9/2011 | Brown | H04L 41/145 |
| | | | | 709/203 |
| 8,094,686 | B2* | 1/2012 | Bedrosian | H04L 43/50 |
| | | | | 703/2 |
| 8,102,776 | B2 | 1/2012 | Fujikami et al. | |
| 2011/0282642 | A1* | 11/2011 | Kruger | G06F 11/3664 |
| | | | | 703/27 |
| 2012/0311387 | A1 | 12/2012 | Santhosh et al. | |
| 2015/0286416 | A1* | 10/2015 | Astigarraga | H04L 41/142 |
| | | | | 709/224 |
| 2015/0288570 | A1 | 10/2015 | Astigarraga | |

OTHER PUBLICATIONS

Fowler et al. "Local Area Network Traffic Characteristics, with Implications for Broadband Network Congestion Management", IEEE Journal on Selected Ares in Communications, vol. 9, No. 7, Sep. 1991.

Kandlur, "Traffic Routing for Multicomputer Networks with Virtual Cut-Through Capability", IEEE Transactions on Computers, vol. 41, No. 10, Oct. 1992.

Wei et al., "Tools for Worm Experimentation on the DETER Testbed", International Journal of Communication Networks and Distributed Systems 5.1 (2010): 151-171.

Golam, "Component-based Network Test Tools Platform for Network Design and Maintenance", A thesis submitted in partial fulfilment of the requirements of Napier University for the degree of Master of Philosophy May 2003.

Fibre Channel, Arbitrated Loop, (FC-AL-2), Rev. 7.0, American National Standard for Information Technology, Apr. 1, 1999.

Fibre Channel, Framing and Signaling-2, (FC-FS-2), Rev. 0.00, American National Standard for Information Technology, May 7, 2003.

Fibre Channel, Link Services, (FC-LS-3), Rev. 3.00, American National Standard for Information Technology, Feb. 21, 2012.

Fibre Channel, Framing and Signaling-4, (FC-FS-4), Rev. 0.10, American National Standard for Information Technology, Apr. 17, 2012.

IBM: List of IBM Patents or Patent Applications Treated as Related (Appendix P), Sep. 11, 2019, 2 pages.

\* cited by examiner

| CHOICE OF PROBABILITY DENSITY FUNCTION OF LATENCY DURATION 601 | LAST 7 BITS OF BYTE 1 OF DELAY HEADER, FIGURE 5: BIT ID OF PROBABILITY DENSITY FUNCTION 512 | BYTE 2 OF DELAY HEADER, FIGURE 5: FIRST PARAMETER 513 | BYTE 3 OF DELAY HEADER, FIGURE 5: SECOND PARAMETER 514 | BYTE 4 OF DELAY HEADER, FIGURE 5: THIRD PARAMETER 515 |
|---|---|---|---|---|
| CONSTANT LATENCY DURATION | 000 0000 | LATENCY DURATION | N/A | N/A |
| EXPONENTIALLY DISTRIBUTED LATENCY DURATION | 000 0001 | EXPECTED VALUE OF LATENCY DURATION (63.2 PERCENTILE) | N/A | N/A |
| UNIFORMLY DISTRIBUTED LATENCY DURATION | 000 0010 | MINIMUM LATENCY DURATION | MAXIMUM LATENCY DURATION | N/A |
| GAUSSIAN DISTRIBUTED LATENCY DURATION | 000 0011 | ARITHMETIC MEAN (AVERAGE) VALUE OF LATENCY DURATION (50 PERCENTILE) | STANDARD DEVIATION OF LATENCY DURATION | NUMBER OF STANDARD DEVIATIONS |
| BINARY DISTRIBUTED LATENCY DURATION | 000 0100 | FIRST VALUE OF LATENCY DURATION | SECOND VALUE OF LATENCY DURATION | N/A |
| RAYLEIGH DISTRIBUTED LATENCY DURATION | 000 0101 | EXPECTED VALUE OF LATENCY DURATION (63.2 PERCENTILE) | SHAPE PARAMETER EQUALS 2 | N/A |
| WEIBULL DISTRIBUTED LATENCY DURATION | 000 0110 | EXPECTED VALUE OF LATENCY DURATION (63.2 PERCENTILE) | SHAPE PARAMETER OF WEIBULL DISTRIBUTION | LATENCY DURATION OFFSET, WHICH MAY BE SET TO ZERO. |

FIG.6

INTRODUCING LATENCY AND DELAY FOR TEST OR DEBUG PURPOSES IN A SAN ENVIRONMENT

BACKGROUND

The present disclosure relates generally to computing systems, and more specifically, to stress-testing a computer system network.

Due to cost and space limitations, many test environments have smaller scale Storage Area Network (SAN) environments with smaller workloads. Testing includes adding latency and simulating a larger SAN hop count, which is the number of hops needed to get from the sender to the receiver to more accurately test products. Current methods that exist to introduce latency and simulate hop count include the addition of physical test tools placed in the environment. For example, U.S. Pat. No. 6,922,663, incorporated herein by reference, teaches a network client simulation tool that virtualizes multiple clients from a single network entity. The simulation tool builds LAN frames of protocol stack level 2, which represent data originating from multiple clients to simulate traffic from multiple clients. It also provides a method for inserting the level 2 LAN frames built onto a physical LAN for actual delivery to a system being tested for simulating real client LAN traffic environment. U.S. Pat. No. 8,102,776, incorporated herein by reference, teaches that simulated network traffic may be generated using a specification of a sequence of frames to be transmitted from the network testing device These tools can only impact the links they are placed on (limited ports) and the tool costs prevent the wide spread use across test teams and configurations.

BRIEF SUMMARY

According to one embodiment, a method, system, and program product is provided. A device sends a latency request. The device receives a latency support confirmation. The device builds an I/O frame. The I/O frame comprises a latency simulating bit and a latency duration. Based on the latency simulating bit and the latency duration, the device holds the I/O frame. The device sends the I/O frame.

According to one embodiment, the holding further comprises calculating, by the device, a latency period based on the latency duration. The latency period is a period of time that the I/O frame is held for.

According to one embodiment, the latency period is calculated by the device using a statistical distribution.

According to one embodiment, the statistical distribution comprises a function selected from a group consisting of: a constant value; an exponential probability density function, the latency delay representing the exponential probability density function by an expected value of the latency delay representing the $63.2^{nd}$ percentile; an uniform probability density function, the latency delay representing the uniform probability density function by a lower limit and an upper limit of the latency delay; a Gaussian probability density function, the latency delay representing the Gaussian probability density function by an arithmetic mean representing the $50^{th}$ percentile, a standard deviation of said latency delay, and the number of standard deviations to be included; a binary probability density function, the latency delay representing the binary probability density function by a first latency duration and a second latency duration; a Rayleigh probability density function, the latency delay representing the Rayleigh probability density function by an expected value of the latency delay representing the $63.2^{nd}$ percentile and a shape factor of two; and a Weibull probability density function, the latency delay representing the Weibull probability density function by an expected value of the latency duration representing the $63.2^{nd}$ percentile, a shape factor, and a latency offset.

According to one embodiment, the device is a server or a switch.

According to one embodiment, the device comprises a controller. The controller is configured for the holding of the I/O frame.

According to one embodiment, the I/O frame comprises an I/O command.

According to one embodiment, the sending of the I/O device comprises sending the I/O frame to a second device.

According to one embodiment, the second device is a server or a switch.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

FIG. 6 illustrates choices in latency delay, in accordance with an embodiment;

DETAILED DESCRIPTION

Figure 1:
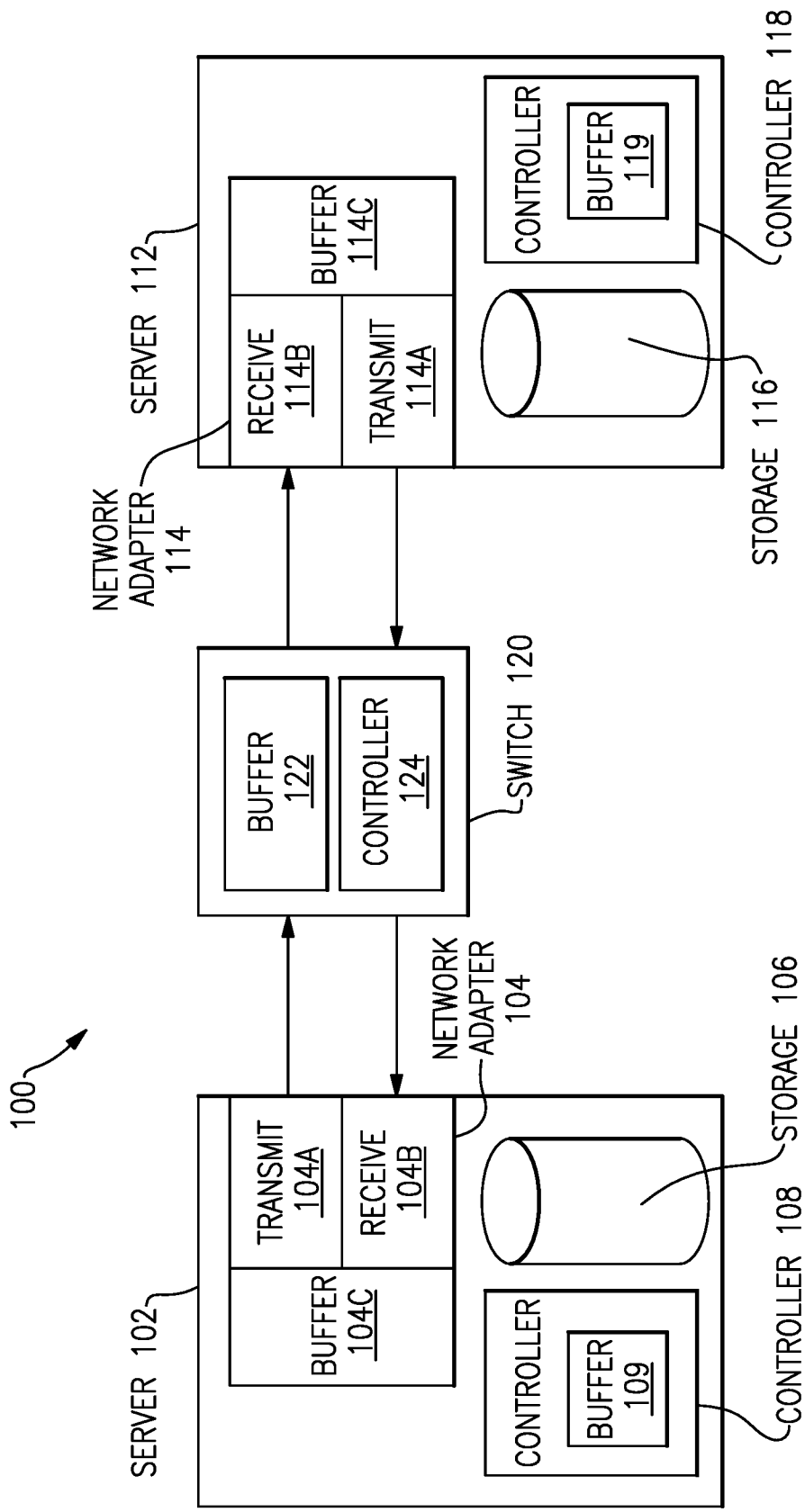
FIG. 1 illustrates a network including a switch connecting two servers, in accordance with an embodiment.

In accordance with an embodiment, a method, system, and computer program product is provided for stress-testing a computer system network, in particular, adding latency and simulating SAN hops to the computer system network. Embodiments described herein are directed to testing network communications. Specific details regarding networking, particularly for Fibre Channel, can be found in "Fibre Channel Link Services (FC-LS-3) REV 3.0", published Feb. 21, 2012, incorporated herein by reference; "Fibre Channel Framing and Signaling—2 (FC-FS-2) Rev 0.00", published May 7, 2003, incorporated herein by reference; "Fibre Channel Arbitrated Loop (FC-AL-2) Rev 7.0, published Apr. 1, 1999, incorporated herein by reference; and "Fibre Channel Framing and Signaling—4 (FC-FS-4) Rev 0.10", published Apr. 17, 2012, incorporated herein by reference.

For example, FC-LS-3 teaches the following:

Class 2 service: A service that multiplexes frames at frame boundaries to or from one or more Nx_Ports with acknowledgement provided.

Class 3 service: A service that multiplexes frames at frame boundaries to or from one or more Nx_Ports without acknowledgement.

Data Frame: An FC-4 Device_Data frame, an FC-4 Video_Data frame, or a Link_Data frame.

Destination_Identifier (D_ID): The address identifier used to indicate the targeted destination Nx_Port of the transmitted frame.

Fabric: The entity that interconnects Nx_Ports attached to it and is capable of routing frames by using the D_ID information in a Frame_Header.

F_Port: An FC_Port within the Fabric that attaches to a PN_Port through a link, and is addressable by the Nx_Ports communicating through the PN_Port attached to the F_Port by the F_Port_Controller well-known address (i.e., FFFFFEh).

FC_Port: A port that is capable of transmitting and receiving Fibre Channel frames according to the FC-0, FC-1, and FC-2 levels of the Fibre Channel architecture.

Information Category: The category to which the frame Payload belongs (e.g., Solicited Data, Unsolicited Data, Solicited Control and Unsolicited Control).

Link Control Facility (LCF): A hardware facility that attaches to an end of a link and manages transmission and reception of data.

Name_Identifier: A 64-bit identifier, with a 60-bit value preceded by a 4-bit Network_Address_Authority Identifier, used to identify entities in Fibre Channel (e.g., Nx_Port, node, F_Port, or Fabric).

Network_Address_Authority (NAA): An organization such as Institute of Electrical and Electronics Engineers (IEEE) that administers network addresses.

Network_Address_Authority (NAA) identifier: A four-bit identifier defined to indicate a Network_Address_Authority (NAA).

N_Port: An Nx_Port communicating through a PN_Port that is not operating a Loop Port State Machine, including services operating at well-known addresses.

N_Port_ID: An address identifier of an Nx_Port used in the identify source (S_ID) and destination (D_ID) fields of a frame that is unique within a topology.

NL_Port: An Nx_Port communicating through a PN_Port that is operating a Loop Port State Machine and without the qualifier Public or Private is assumed to be a Public NL_Port.

Nx_Port: An end point for Fibre Channel frame communication (see FC-FS-3) that is used in this standard to specify behavior of either N_Ports or Public NL_Ports that does not specify or constrain the behavior of Private NL_Ports.

Payload: Contents of the Data_Field of a frame, excluding Optional Headers and fill bytes, if present.

PN_Port: An LCF that supports only Nx_Ports.

Public NL_Port: An NL_Port that attempts a Fabric Login.

Private NL_Port: An NL_Port that does not attempt a Fabric Login and does not transmit open primitive (OPN).

Sequence: A set of one or more Data frames with a common Sequence_ID (SEQ_ID), transmitted unidirectionally from one Nx_Port to another Nx_Port with a corresponding response, if applicable, transmitted in response to each Data frame.

Sequence_ID (SEQ_ID): An identifier used to identify a Sequence.

One embodiment of a network is described in reference to FIG. 1. FIG. 1 illustrates network 100 with servers 102, 112 and intervening switch 120. Each server comprises network adapter 104, 114 and storage 106, 116 and controller 108, 118. Each network adapter has a transmit module 104A, 114A and a receive module 104B, 114B and a buffer 104C, 114C. Each controller 108, 118 has a buffer 109, 119, respectively. Each controller, 108, 118, 124 may also include a random number generator (not shown). Switch 120 has buffer 122 and controller 124. Communications between servers 102, 112 occurs through switch 120, and may use Gigabet Ethernet (GbEN), Fibre Channel, Fibre Channel over Ethernet, Small Computer System Interface (SCSI), Internet Computer System Interface (iSCSI), Infiniband protocols, and the like.

Figure 2:
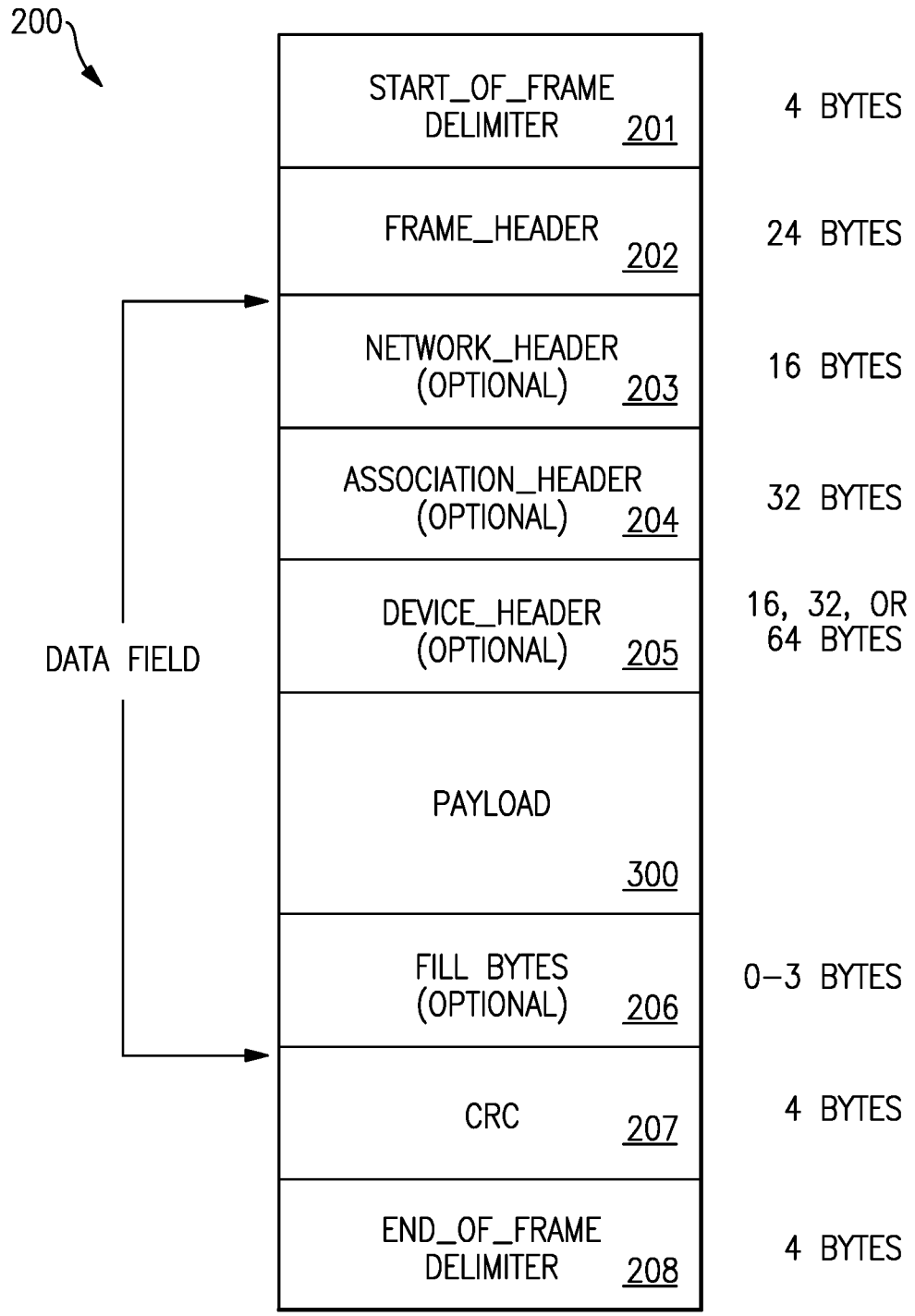
FIG. 2 illustrates a Fabric Log In (FLOGI) frame, in accordance with an embodiment.

One embodiment of a Fabric Log In (FLOGI) frame is described in reference to FIG. 2. FIG. 2 shows FLOGI frame 200, comprising a Start_of_Frame (SOF) delimiter 201 (4 bytes), Frame Feeder 202 (24 bytes), Network_Header 203 (16 bytes), Association_Header 204 (32 bytes), Device_Header 205 (16, 32, or 64 bytes), a Payload 300 (for example a FLOGI, Port Login (PLOGI), Discover F_Port (FDISC) or Link Service Accept (LS_ACC) payload) described in FIG. 3, fill bytes 206 (0-3 bytes), Cyclical Redundancy Check (CRC) 207 (4 bytes), and an End of Frame delimiter 208 (4 bytes). The Network_Header 203, Association_Header 204, Device_Header 205 and Fill Bytes 206 may be optional in the frame. The data field comprises the Network Header 203, association header 204 (32 bytes), device_header 205, payload 300, fill bytes 206 (0-3 bytes). The data field may also comprise an Encapsulating Security Payload (ESP) Header and Trailer, not shown in FIG. 2, which is used for ESP, a mechanism to provide confidentiality, data origin, authentication, and anti-replay protection of Internet Protocol (IP) packets.

The SOF delimiter 201 is an ordered set that immediately precedes the frame content. It marks the beginning of the frame. The Frame Header 202 is 24 bytes of information used in Fibre Channel frames and contains information such as routing control, destination identifier, originating exchange, source identifier, etc. Network Header 203, which may also be known as the Ethernet Header, is an optional header whose presence may be indicated by a field in the Frame_Header 202.

The Network Header 203 may be used for routing between Fibre Channel networks of different Fabric address spaces, or Fibre Channel and non-Fibre Channel networks. The Association Header 204 may be used to identify a specific process or group of processes within a node associated with an exchange. When an Nx_Port has indicated during Login that an Initial Process Associator is required to communicate with it, the Association Header 204 shall be used by that Nx_Port to identify a specific Process or group of Processes within a node associated with an Exchange. The Device Header 205 may contain FC-4/Upper layer protocol specific data based on a Type field in the Frame Header 202. If present, the Device Header 205 may be present in either the first Data frame or in all Data frames of a Sequence. Upper level protocol (ULP) types may also make use of the Device Header 205. The Device Header 205 may be ignored and skipped if not needed. If a Device Header 205 is present for a ULP that does not require it, the related FC-4 level of the Fibre Channel protocol may reject the frame. The Payload 300, further described in FIG. 3, contains the contents of the data field of a frame, excluding optional headers, 203, 204, 205 and Fill Bytes 206, if present. The Fill Bytes 206 is used to pad out a frame to a word boundary because of Fibre Channel requirements that all frames end on a 4-byte boundary. The CRC 207 may be used to verify the data integrity of the data within the frame. The End of Frame (EOF) delimiter 208 is represented by an Ordered Set that immediately follows the CRC. The EOF Ordered Set may designate the end of the frame.

Figure 3:
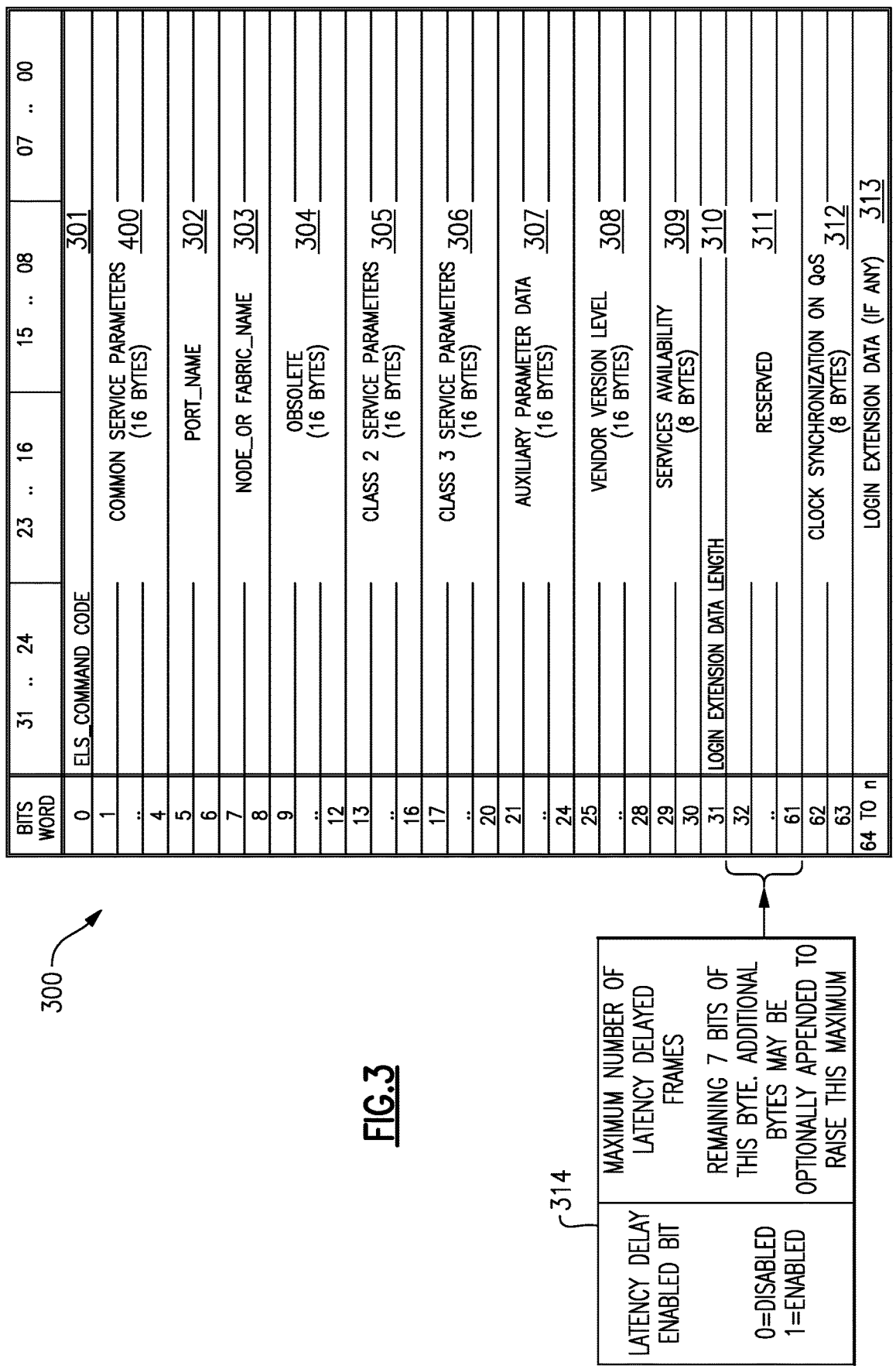
FIG. 3 illustrates a payload, including reserve bits, in accordance with an embodiment.

One embodiment of a payload is described in reference to FIG. 3. The payload 300 may be representative of a FLOGI, PLOGI, FDISC, or LS_ACC payload. Payload 300 includes Extended Link Services (ELS) Command code 301, Common Service Parameters (16 bytes) 400 which is further discussed in FIG. 4, Port_name 302, Node_ or Fabric_name 303, Obsolete bytes 304, Class 2 Service Parameters 305 (16 bytes), Class 3 Service Parameters 306 (16 bytes), Auxiliary Parameter Data 307 (16 bytes), Vendor Version Level 308 (16 bytes), Service Availability 309 (8 bytes), Login Extension Data Length 3010, Reserved Bytes 311, Clock Synchronization QoS 312 (8 bytes), and Login Extension Data 313 (if any).

ELS_Command code 301 may be a 4-byte field (word 0) that identifies, for example a PLOGI, FLOGI, or LS_ACC. Every extended link service is assigned a code. It defines the bits and bits that follow this field.

The Port_Name 302 may be an eight-byte field (words 5-6) that identifies an Nx_Port. Each Nx_Port, including Nx_Ports that have Well-known addresses, shall provide a Name_Identifier. Nx_Ports that are not assigned to Well-known addresses shall provide a Name_Identifier that is unique within the Fibre Channel interaction space of the Nx_Port. Bits 63-60 specify the format of the Name Identifier.

The Node_Name or Fabric_Name 303 may be an eight-byte field (words 7-8) that labels a Node or Fabric for identification purposes, such as diagnostics. The Node_Name and Fabric_Name 303 are independent of and unrelated to network addressing. Each Node_Name or Fabric_Name 303 shall be unique within the Fibre Channel interaction space. Bits 63-60 specify the format of the name. Node_Name may be applicable to PLOGI, PLOGI LS_ACC and FLOGI. Fabric_Name may be applicable to FLOGI LS_ACC.

The Obsolete 304 may be a 16-byte field (words 9-12). This field is not used.

The Class 2 Service Parameters 305 may be a 16-byte field (words 13-16). The Class 3 Service Parameters 306 may be a 16-byte field (words 17-20). These parameters are further described in FIG. 4.

The Auxiliary Parameter Data 307, which may also be known as the Data Field Control (DF_CTL), may be a 16-byte field (words 21-24). This field specifies whether the data portion of Payload 300 is used for a non data purpose. It may also specify the first n number of bytes designated for the non data purpose.

Vendor Version Level 308 field may be a 16-byte field (words 25-28) and may specify vendor-specific information. If the Valid Version Level bit in the Common Service Parameters field 400 (word 1, bit 29) is set to one, the Vendor Version Level field 308 contains valid information. If the Valid Version Level bit is set to zero, the Vendor Version Level field 308 is not meaningful.

The Services Availability field 309 may be a 8-byte field (word 29-30) that returns information regarding the Fabric's ability to route to the defined well-known addresses. It is meaningful only for FLOGI LS_ACC. Only bits 10-3 of word 30 are meaningful. Word 29 and bits 31-11 and 2-0 of word 30 are reserved.

The Login Extension Data Length 310 may be an 8-byte field (word 31). If the Login Extension Data Length field 310 is non-zero, a Login Extension follows the normal payload. The Login Extension Data Length field 310 indicates the length of the Login Extension field in words. The Payload Bit located in the Common Service Parameters 400 shall be set to one if this field is non-zero.

The Reserved Bytes 311 may be 32 bits, or 4 bytes, per word. In one embodiment, the Reserved Bytes may include 30 words, for example Bits Word 32-61, thus resulting in 120 bytes total in reserve, for future use. The Reserved Bytes may include a Latency Delay Bit (also known as Latency Delay Enabled bit or Latency Simulating Bit) and Maximum Number of Latency Delayed Frames, 314.

In one embodiment of the invention, the Latency Delay Enabled Bit and the Maximum Number of Latency Delayed frames, 314, may be located in the first byte. The first bit of this byte denotes whether the latency delay is disabled or enabled. For example, disabled may be represented by the bit=0 and enabled may be represented by the bit=1. If the latency delay is enabled (bit=1), then the controllers 108, 118, 124 know to search the I/O command 500 for delay header information which is then utilized. If the remaining bits of this byte are zero, then the number of frames with a latency delay 314 are unlimited, until the latency delay process is terminated by the user. However, if the remaining bits of this byte are non-zero, then the number of frames which are latency delayed 314 are limited to the number denoted by those remaining seven bits, after which time the latency-delay process auto-terminates. Additional reserved bytes may be appended to the first byte to add to the number of frames which are latency delayed before the latency delay process auto-terminates. Thus, the latency delay process may be enabled via a FLOGI, PLOGI, FDISC, or a LS_ACC.

The Clock Synchronization Quality of Service (QoS) field may be 8-bytes (word 62-63) for syncing the clock for the purposes of the simulated delay. This insures consistent simulated delays. This field revolves around a service, for example a service that resides in a switch, called the Clock Synchronization Server. During the login process, this field is used to check if the Clock Synchronization Server exists.

The Login Extension Data 313 may be specified by the any number of bytes located from word 64 and on. This field specifies additional data that may be necessary for a login, which extends the size of the login frame.

Figure 4:
FIG. 4 illustrates Common Service Parameters for Port Log In (PLOGI), Fabric Log In (FLOGI), and Fabric Log In Link Service Accept (FLOGI LS_ACC), in accordance with an embodiment.

One embodiment of Common Service Parameters for PLOGI, FLOGI, and FLOGI LS_ACC, is described in reference to FIG. 4. FIG. 4 illustrates Common Service Parameters 400, of which FLOGI LS_ACC is a part. Common Service Parameters 400 may be defined by the Fibre Channel Link Services specification. Common Service Parameters 400 may include Fibre Channel Physical Interface (FC-PH) Version 401 (which may be obsolete and not used), Buffer-to-Buffer Credit 402 and Common Features 403. Common Features 403 may include Continuously Increasing Relative Offset 404, Clean Address 404, Multiple N_Port_ID Support 406, Random Relative Offset 407, Virtual Fabrics Bit 408, Valid Vendor Version Level 409, and Multiple N_Port_ID Assignment 410. FIG. 4 further illustrates the Word 411, Bits 412, Default Login Value 413 and the parameter applicability for PLOGI and PLOGI LS_ACC 414, FLOGI 415, AND FLOGI LS_ACC 416. Each parameter applicability 414, 415, 416 may be use in either Class 2 or Class 3 protocols, or both. Class 2 is an acknowledgement protocol, where every frame has an ACK(nowledgement), which adds overhead. Class 3 is unacknowledged transmission of frames, which offers higher performance due to the absence of ACKs. The use of Class 3 is more prevalent for data transmission, with Class 2 being used for critical command and control.

The buffer-to-buffer Credit field 402 (word 0, bits 15-0) defines the number of buffers available for holding Class 2, or Class 3 frames received. An FC_Port tracks Buffer-to-buffer Credit as a single entity for all frames subject to buffer-to-buffer flow control. Values in the Buffer-to-buffer Credit field 402 are 1 to 32 767. The value 0 is reserved.

Continuously increasing relative offset 404 may comprise a bit, for example word 1, bit 31. If the continuously increasing relative offset bit (word 1, bit 31) is set to one, the Nx_Port supplying this parameter shall be capable of supporting continuously increasing relative offset, if present, within a Sequence on a frame by frame SEQ_CNT (sequence count) basis. This bit shall only be applicable to those Information Categories in which an Nx_Port supports relative offset (i.e., word 2, bits 15-0).

The Clean Address bit 405 (word 1, bit 31) provides an indication to an Nx_Port as to whether the address it was assigned by the Fabric had been previously used by another device within a Resource_Allocation_Timeout value (R_A_TOV). If this bit is set to zero, the assigned address may or may not have been used by a previous device within R_A_TOV. If this bit is set to one, the assigned address has not been used by any other device within R_A_TOV, or has been assigned to the current device for a previous FLOGI and not been changed within R_A_TOV. This bit is only meaningful in the FLOGI LS_ACC, it is not meaningful in the FLOGI request.

The Multiple N_Port_ID Support bit 406 (word 1, bit 31) shall be set to one to indicate that the PN_Port supplying this parameter is capable of requesting multiple N_Port_IDs using the FDISC ELS. The N_Port_ID Support bit shall be set to zero to indicate that the PN_Port supplying this parameter is not capable of requesting additional N_Port_IDs. This bit is only meaningful in the FLOGI request, it is not meaningful in the FLOGI LS_ACC.

The Random relative offset 407 (word 1, bit 30) indicates that the Nx_Port supplying this parameter shall be capable of supporting random relative offset values, if present. Random values may increase, decrease, or otherwise fluctuate within a Sequence. This bit shall only be applicable to those Information Categories in which an Nx_Port supports relative offset (i.e., word 3, bits 15-0).

The Virtual Fabrics bit 408 (word 1, bit 30) indicates support for Virtual fabrics. Virtual fabrics, for example, may include Virtual Cluster Switching (VCS) Fabric technology which is a Layer 2 Ethernet technology designed to improve network utilization, maximize application availability, increase scalability, and dramatically simplify the network architecture in virtualized data centers. It comprises three pillars of innovation technology: Ethernet fabrics, Distributed Intelligence, and Logical Chassis. VCS Fabric technology is designed to incorporate a set of Dynamic Services for the highest level of functionality and investment protection for data centers, making it a core building block for virtualizing data center networks.

The Valid Vendor Version level 409 (world 1, bit 29), in PLOGI, PLOGI LS_ACC, and FLOGI, may be set to one or zero. If the Valid Vendor Version Level bit 409 is set to one, the Vendor Version Level 308 (words 25 through 28 in FIG. 3) contains valid information. If it is set to zero, the Vendor Version Level field 409 is not meaningful.

The Multiple N_Port_ID Assignent 410 (word 1, 29) may be a one or a zero. When the Multiple N_Port_ID Support bit 406 in the FLOGI request is one, the Multiple N_Port_ID Assignment bit 410 shall be set to one if the F_Port_supplying this parameter is capable of assigning multiple N_Port_IDs to the attached PN_Port using the FDISC ELS. The Multiple N_Port_ID Assignment bit 410 shall be set to zero when the Multiple N_Port_ID Support bit 407 in the FLOGI request is zero or to indicate that the F_Port_is not capable of assigning multiple N_Port_IDs to the attached PN_Port when the Multiple N_Port_ID Support bit 407 in the FLOGI request is one. This bit is only meaningful in the FLOGI LS_ACC, it is not meaningful in the FLOGI request.

Figure 5:
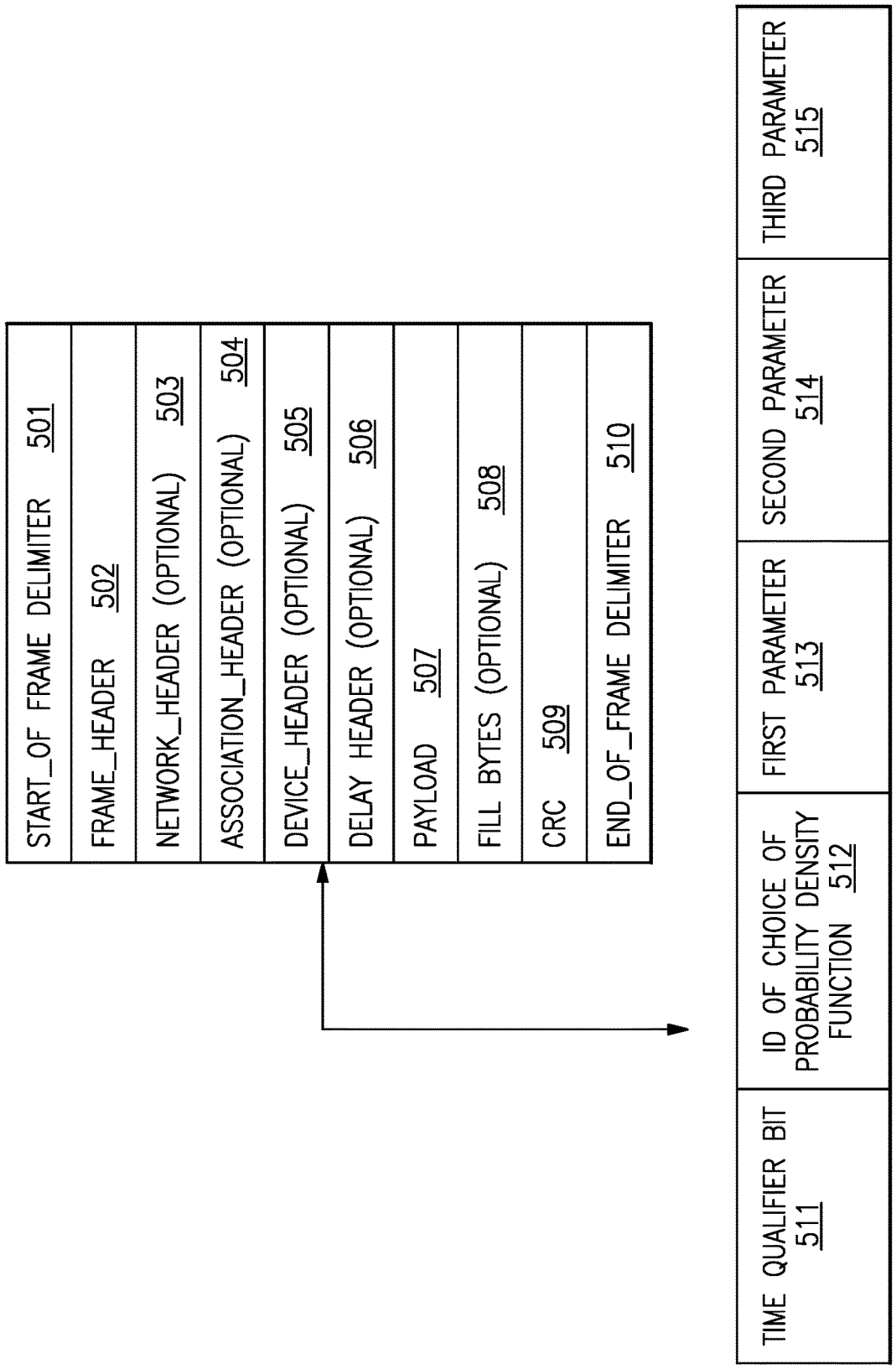
FIG. 5 illustrates an I/O command frame, including a delay header field, in accordance with an embodiment.

One embodiment of an Input/Output (I/O) Command is described in reference to FIG. 5. FIG. 5 illustrates I/O Command 500 which includes a Delay Header field 506 of 4 bytes. Additional components of I/O Command 500 includes Start_of_Frame delimiter 501 (4 bytes), Frame Header 502 (24 bytes), Network Header 503 (16 bytes), Association header 504 (32 bytes), Device Header 505 (16, 32, or 64 bytes), Delay Header 506 (4 bytes), Payload 507, Fill Bytes 508 (0-3 bytes), cyclical redundancy checks (CRC) 509 (4 bytes), and End of Frame Delimiter 510 (4 bytes). The Network Header 503, Association Header 504, Device Header 505, Delay Header 506, and Fill Bytes 508 may be optional. The Start of Frame Delimiter 510, Frame Header 502, Network Header 503, Association Header 504, Device Header 505, Payload, Fill Bytes, CRC 509, and End of Frame delimiter 501 fields have been previously described with respect to FIGS. 2 and 3, above.

The Delay Header 506 may comprise a Time Qualifier Bit 511, an ID of Choice of Probability Density Function 512, a First Parameter 513, Second Parameter 514, and a Third Parameter 515. The Leading Time Qualifier Bit 511 may be located in the first byte of the Delay Header 506 and may be a 0 value if the units of time (the time used for the delay) is in microseconds or a 1 value if the units of time is in milliseconds. The ID of the Choice of Probability Density Function 512 may be located in the last 7 bits of the first byte of the Delay Header 506, and is described further in FIG. 6. The First Parameter 515 which may be located in the second byte of the Delay Header 506, the Second Parameter 516 which may be located in the third byte of the Delay Header 506, and the Third Parameter which may be located in the fourth byte of the Delay Header 506, contain information as further described in FIG. 6. In one embodiment, this delay header information 509 may be included in the FLOGI (Fabric Log-In), PLOGI (Port Log-In), FDISC (Discovery of F_Port Service Parameters), and LS_ACC (Link Service Accept) Reserve Bytes 310 described in FIG. 3, and may apply to all commands, such as control commands, and not just limited to data commands such as I/O Command 500.

FIG. 6 illustrates possible values for the ID of Choice of Probability Density Function 512, the First Parameter 513, the Second Parameter 514, and the Third Parameter 515, in accordance with an embodiment. The Choice of Probability Density Function 512 may be a constant latency duration, an exponentially distributed latency, a uniformly distributed latency duration, a Gaussian distributed latency duration, a binary distributed latency duration, a Rayleigh distributed latency duration, and a Weibull distributed latency duration. Exponential, uniform, Gaussian, Rayleigh, and Weibull probability density functions are well known in the art. The ID of Choice of Probability Density Function 512 column describes the bit values used to identify the type of Choice of Probability Density Function of Latency Duration 601. The First Parameter 515, Second Parameter 516, and Third Parameter 517 columns contain a description of the type of values to be stored in each respective field.

The Choice of Probability Density Function of Latency Duration describes multiple durations. The constant latency duration consists of a single specified latency duration. The exponentially distributed latency duration consists of the expected value of latency duration (63.2$^{nd}$ percentile). The uniformly distributed latency duration includes both a minimum and a maximum latency duration. The Gaussian distributed latency duration includes the arithmetic mean (average) value of latency duration (50 percentile), standard deviation of latency duration, and number of standard deviations. The binary distributed latency duration includes a first and a second value of latency duration. The Rayleigh distributed latency duration includes the expected value of latency duration (63.2$^{nd}$ percentile) and a shape parameter of two. The Weibull distributed latency duration includes the expected value of latency duration (63.2$^{nd}$ percentile), a shape parameter, and a latency duration offset, which may be zero.

The exponential probability density function is shown in equation [1] (shown below), where C is the characteristic latency duration and C=x at 63.2%, exp is the exponential function. Controllers 108, 118, and 124 may implement equations [1-4] (shown below), as well as the uniform and binary distributed latency durations, in software, for example open source software.

$$f(x)=(1/C)*\exp(-x/C) \quad (1)$$

The Gaussian probability density function is shown in equation [2] (shown below), where U is average value of the latency duration and U=x at 50%, and S is the standard deviation. Since the Gaussian probability density function extends from minus infinity to plus infinity, the domain or input to the Gaussian probability function is limited to n standard deviations, where n is user defined.

$$f(x)=\{1/[S*\sqrt{(2\pi)}]\}*\exp[-(x-U)^2/(2S^2)] \quad (2)$$

The Weibull probability density function is shown in equation [3] (shown below), where B is the shape parameter, also know as the Weibull slope, and Xo is the latency duration offset, also known as the location parameter or minimum value of x. Xo may be set to zero.

$$f(x)=[B/(C-Xo)]*[(x-Xo)/(C-Xo)]^{(B-1)}*\exp\{-[(x-Xo)/(C-Xo)]^B\} \quad (3)$$

The Rayleigh probability density function is shown in equation [4] (shown below), which is equation [3] with the special case of B=2 and Xo=0.

$$f(x)=[B/C]*[x/C]*\exp\{-[x/C]^2\} \quad (4)$$

An exponential probability density function is a special case of the Weibull probability density function, where the shape parameter is unity (B=1) and the latency duration offset Xo is zero. The Rayleigh probability density function is a special case of the Weibull probability density function, where the shape parameter is two (B=2) and the latency duration offset Xo is zero. The Weibull probability density function with a shape parameter of B=3.5 mimics the Gaussian probability function. The binary probability density function is a discrete probability density function, one equivalent to flipping a coin, where heads gives the first value of latency duration, and tails gives the second value of latency duration. The constant latency duration is equivalent to these special cases: (a) the Gaussian probability density function with a zero standard deviation, (b) a binary probability density function where the first and second values of latency duration are equal, or (c) a uniform probability density function where the minimum and maximum latency durations are equal.

One embodiment of an implementation is that of the intelligent controller in a server, such as servers 102, 112. The location of the latency buffer is in the controller, such as buffer 109, 119 in controller 108, 118. The intelligent controller (a) calculates the latency duration, for example per the Probability Density Function described in FIG. 6, using any necessary parameters and (b) holds the frame in its buffer until the latency duration has expired before (c) sending the frame to the network adapter, such as network adapter 104, so that the frame can be transmitted to the receiving network adapter, such as network adapter 114 or a network adapter in a receiving switch. No delay header field may be needed in the header, such as the delay header of I/O Command 500, when the frame is transmitted to the receiving network adapter, because the entire latency activity is invisible to the receiving network adapter.

An alternative embodiment is an intelligent controller located in a switch, such as switch 120. The intelligent controller, such as controller 124, (a) calculates the latency duration, for example per the Probability Density Function described in FIG. 6, using any necessary parameters and (b) holds the frame in its buffer, such as buffer 122, until the latency duration has expired before (c) sending the frame to the receiving network adapter, such as network adapter 114 or a network adapter in a receiving switch. No delay header field may be needed in the header, such as the delay header of I/O Command 500, when the frame is transmitted to the receiving network adapter because the entire latency activity is invisible to the receiving network adapter.

Yet another alternative embodiment is that of an intelligent transmitter in network adapter, such as transmitter 104A in network adapter 104 or a transmitter in a transmitting switch. The intelligent Transmitter in the sending network adapter (a) calculates the latency duration, for example per the Probability Density Function described in FIG. 6, using any necessary parameters and (b) puts the latency duration in the delay header as a constant latency duration The receiving network adapter, such as network adapter 114 or a network adapter in a receiving switch, holds the frame in its buffer, such as buffer 114C or a buffer in the receiving switch, until the latency duration has expired and only then (d) declares the frame to be received.

Yet another alternative embodiment is that of an Intelligent Receiver in Network Adapter, such as receiver 114B in network adapter 114 with buffer 114C or a receiver in a receiving switch. Transmitter, such as transmitter 104A or a transmitter in a transmitting switch, sends information regarding latency duration, for example the delay header 506 in I/O frame 500, to a receiver, such as receiver 114B or a receiver in a receiving switch. The delay header 506 in I/O frame 500 may contain the ID of Choice of Probability Density Function 512, the First Parameter 513, the Second Parameter 514, and the Third Parameter 515 as described in FIG. 5 and FIG. 6. The intelligent receiver (a) puts the I/O frame into its own buffer, such as buffer 114C or a buffer in the receiving switch, (b) reads the delay header, (c) calculates the latency duration, and (d) holds the frame in its own buffer until the calculated latency duration expires, and only then (e) declares the frame to be received.

Figure 7:
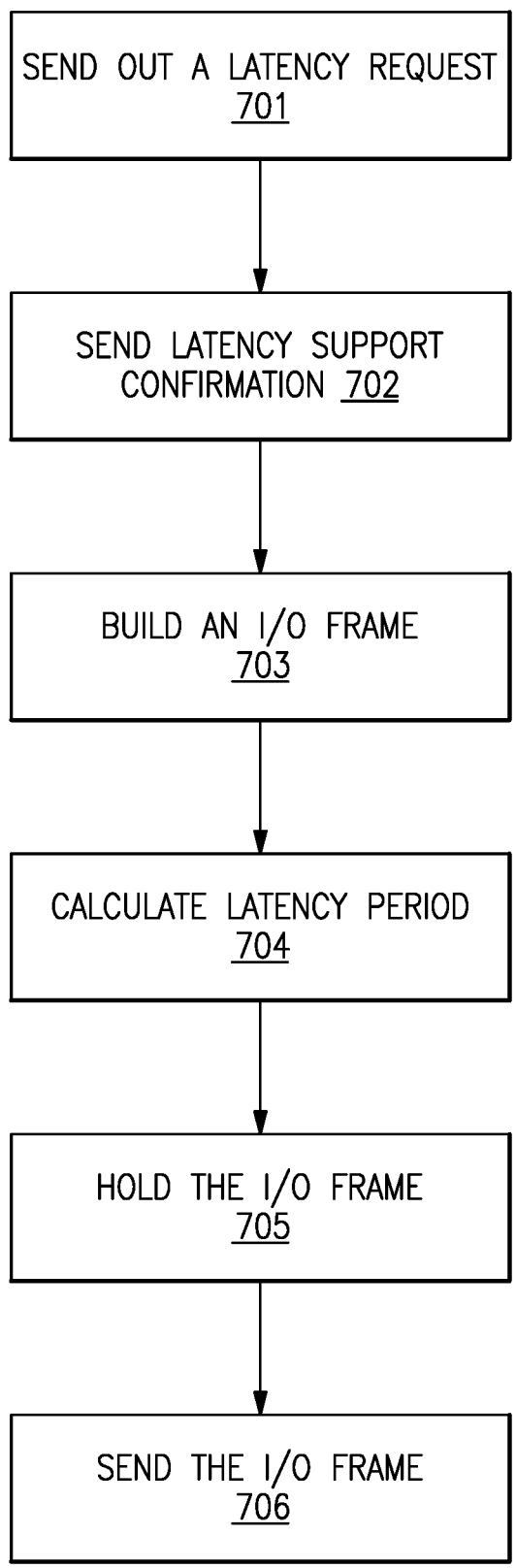
FIG. 7 illustrates a process for latency simulation in accordance an embodiment.

One embodiment of a process for latency simulation is described in reference to FIG. 7. A first device, for example a server, may issue an initial I/O request, which includes an I/O command to which the latency simulation or delay will be applied, for example to all writes, to all reads, or both. The first device, which may be for example a server or a switch, may send out a latency request to a second device, which may be for example a server or a switch, 701. This latency request is used to determine if the second device supports latency simulation. The second device receives the latency request, and if it supports latency simulation, it will send a latency support confirmation back to the first device, 702. After receipt of a latency support confirmation, the first device may build an I/O frame based on an initial I/O request to simulate latency 703. The I/O frame may be in the format described in FIG. 5 and may include a latency simulating bit and a maximum number of latency delayed frames field in the payload as described in FIG. 3. In one embodiment, the latency simulating bit in the I/O frame may be checked to make sure that latency simulation is enabled for that particular I/O frame before the calculating and holding (704 and 705) steps are performed.

In one embodiment, the first device performs steps 704, 705, and 706. In this embodiment, a delay header as previously described above in FIG. 5 is not required; however it may be optionally included when the first device builds the I/O frame 703. Based on the I/O frame, a latency period is calculated 704 by the first device, where the latency period may depend on the choice of probability density function as described in FIG. 6. Subsequently, the I/O frame is held for the calculated latency period 705 by the first device. After the holding 705, the I/O frame is sent 706 by the first device to the second device.

In one embodiment, the second device performs steps 704, 705, and 706. In this embodiment, a delay header as previously described above in FIG. 5 may be included when the first device builds the I/O frame 703. The first device sends the I/O frame to the second device for processing, not shown in the figure. Based on the I/O frame, a latency period is calculated 704 by the second device, where the latency period may depend on the choice of probability density function as described in FIG. 6. Subsequently, the I/O frame is held for the calculated latency period 705 by the second device. After the holding 705, the I/O frame is sent on 706 by the second device, where it is either released as being a received I/O frame, or sent on to another device in the network.

In one embodiment, the first device performs step 704 and the second device performs steps 705, and 706. In this embodiment, a delay header as previously described above in FIG. 5 may be included when the first device builds the I/O frame 703. Based on the I/O frame, a latency period is calculated 704 by the first device, where the latency period may depend on the choice of probability density function as described in FIG. 6. The first device sends the I/O frame to the second device for processing, not shown in the figure. Subsequently, the I/O frame is held for the calculated latency period 705 by the second device. After the holding 705, the I/O frame is sent on 706 by the second device, where it is either released as being a received I/O frame, or sent on to another device in the network.

In one embodiment, the calculating step 704, whether by the first device or the second device, includes checking to see if there is a constant latency duration in the delay header in the I/O frame. If there is, no additional calculation is performed, and the process moves on to the next step.

In one embodiment, based on the maximum number of latency delayed frames field in the payload of the I/O frame, a subsequent number of frames will also be held based on the same parameters of the I/O frame.

The above creates a stress-test condition which simulates customer installations and workloads without the need of full-scale glass-house installations.

As will be appreciated by one skilled in the art, the embodiments may be embodied as a system, method or computer program product. Accordingly, the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiment may take the form of a computer program product embodied in any tangible medium of expression having computer usable program code embodied in the medium.

Figure 8:
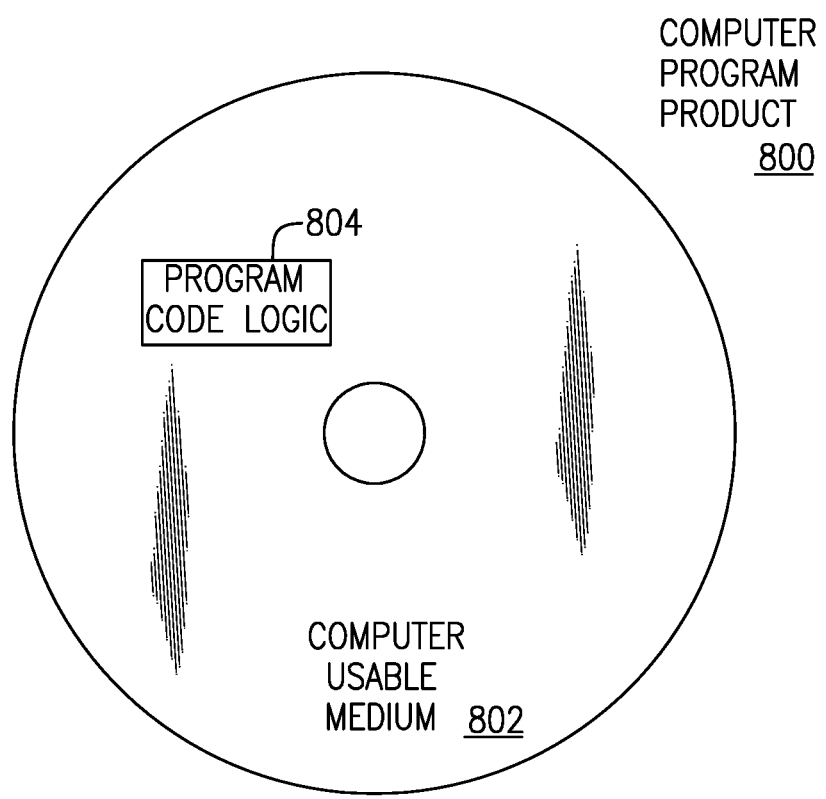
FIG. 8 illustrates a computer program product to incorporate an embodiment.

One example of a computer program product incorporating one or more aspects of an embodiment is described with reference to FIG. 8. A computer program product 800 includes, for instance, one or more computer usable media 802 to store computer readable program code means or logic 804 thereon to provide and facilitate one or more aspects of an embodiment. Any combination of one or more computer usable or computer readable medium(s) may be utilized. The computer-usable or computer-readable medium may be, for example but not limited to, an electronic, magnetic, optical, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable medium may be any storage medium that can contain or store the program for use by or in connection with the instruction execution system, apparatus, or device.

Computer program code for carrying out operations of the embodiment may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 9:
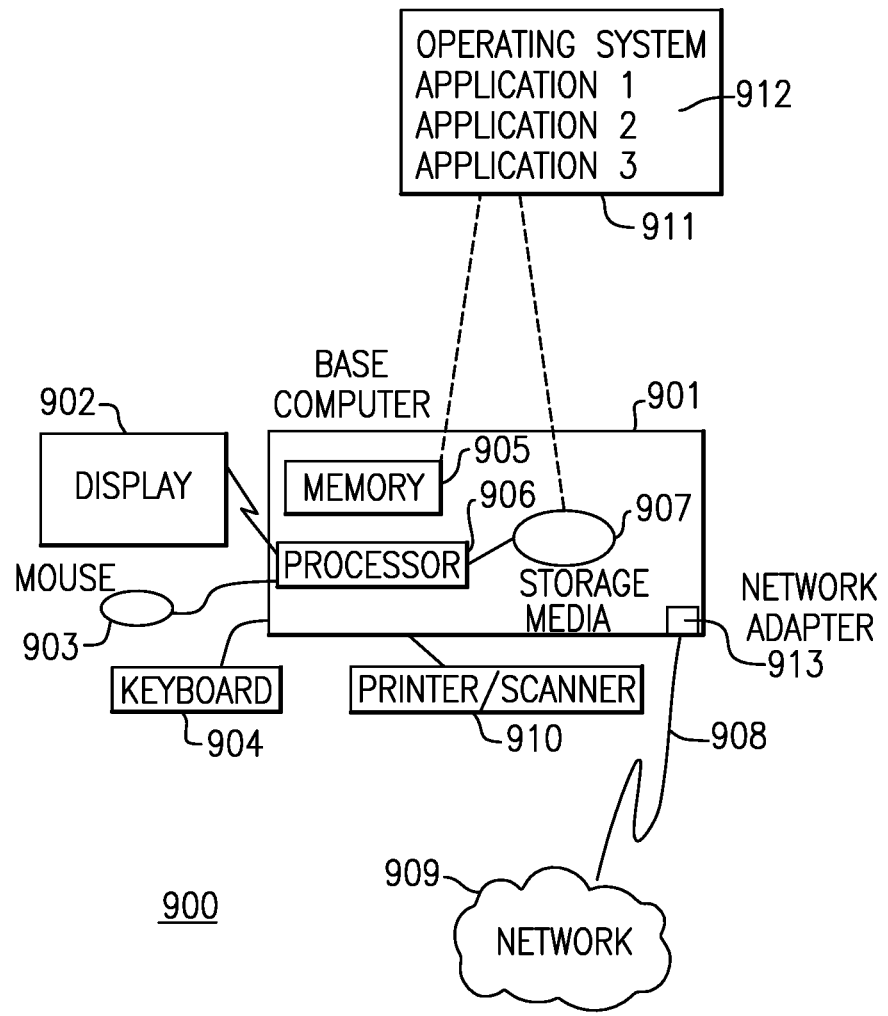
FIG. 9 illustrates a computer system in which an embodiment may be practiced.

FIG. 9 illustrates an embodiment of a workstation, server hardware system, in which an embodiment may be practiced. The system comprises a computer system 901, such as a personal computer, a workstation, a server, a storage device, or host, including optional peripheral devices. The computer system 901 includes one or more processors 906 and a bus employed to connect and enable communication between the processor(s) 906 and the other components of the computer system 901 in accordance with known techniques. The bus connects the processor 906 to memory 905 and long-term storage 907 which can include a hard drive (including any of magnetic media, CD, DVD and Flash Memory for example) or a tape drive for example. The computer system 901 might also include a user interface adapter, which connects the microprocessor 1006 via the bus to one or more interface devices, such as a keyboard 904, mouse 903, a printer/scanner 910 and/or other interface devices, which can be any user interface device, such as a touch sensitive screen, digitized entry pad, etc. The bus also connects a display device 902, such as an LCD screen or monitor, to the microprocessor 906 via a display adapter.

The computer system 901 may communicate with other computers or networks of computers by way of a network adapter 913, for example a network interface controller (NIC), capable of communicating 908 with a network 909. For example, network adapters may include communications channels, token ring, Ethernet or modems. The computer system 901 may also include a controller, not shown, connected to the network adapter. Alternatively, the computer system 901 may communicate using a wireless interface, such as a CDPD (cellular digital packet data) card. The computer system 901 may be associated with such other computers in a Local Area Network (LAN), VLAN, or a Wide Area Network (WAN), or the computer system 901 may be a client in a client/server arrangement with another computer, etc. All of these configurations, as well as the appropriate communications hardware and software, are known in the art.

Software programming code which embodies an embodiment may be typically accessed by the processor 906 from long-term storage media 907. The software programming code may be embodied on any of a variety of known media for use with a data processing system, as previously described above with reference to FIG. 8. The code may be distributed on such media, or may be distributed to users from the memory or storage of one computer system over a network to other computer systems.

Alternatively, the programming code 911 may be embodied in the memory 905, and accessed by the processor 906 using the processor bus. Such programming code may include an operating system which controls the function and interaction of the various computer components and one or more application programs 912. Program code may be normally paged from storage media 907 to memory 905 where it may be available for processing by the processor 906. The techniques and methods for embodying software programming code in memory, on physical media, and/or distributing software code via networks are well known and will not be further discussed herein. The computer program product medium may be typically readable by a processing circuit preferably in a computer system for execution by the processing circuit.

The flow diagrams depicted herein are just examples. There may be many variations to these diagrams or the steps (or operations) described therein without departing from the spirit of the embodiment. For instance, the steps may be performed in a differing order, or steps may be added, deleted or modified. All of these variations are considered a part of the claimed embodiment.

While the preferred embodiment has been described, it will be understood that those skilled in the art, both now and in the future, may make various improvements and enhancements which fall within the scope of the claims which follow.

What is claimed is:

1. A method for simulating latency, the method comprising:
    sending, from a first device to a second device, an initial I/O request comprising a request to confirm whether the second device supports latency simulation, and wherein the first device and the second device are a server, a controller, or a switch;
    based on the second device supporting latency simulation, the second device sending to the first device, a latency support confirmation;
    in response to receiving the latency support confirmation, the first device building, an I/O frame, comprising an I/O command, comprising a read data, or a write data, and a latency period, that is based on a calculated latency duration; and
    the first device sending the I/O frame to the second device upon the expiration of the latency duration.

2. The method according to claim 1, wherein said latency duration is calculated by said first device using a function that outputs a statistical distribution.

3. The method according to claim 2, wherein said statistical distribution comprises a function selected from a group consisting of:
    an exponential probability density function, said latency delay representing said exponential probability density function by an expected value of said latency delay representing the $63.2^{nd}$ percentile;
    an uniform probability density function, said latency delay representing said uniform probability density function by a lower limit and an upper limit of said latency delay;
    a Gaussian probability density function, said latency delay representing said Gaussian probability density function by an arithmetic mean representing the 50th percentile, a standard deviation of said latency delay, and the number of standard deviations to be included;
    a binary probability density function, said latency delay representing said binary probability density function by a first latency duration and a second latency duration;
    a Rayleigh probability density function, said latency delay representing said Rayleigh probability density function by an expected value of said latency delay representing the $63.2^{nd}$ percentile and a shape factor of two; and
    a Weibull probability density function, said latency delay representing said Weibull probability density function by an expected value of said latency duration representing the $63.2^{nd}$ percentile, a shape factor, and a latency offset.

4. A computer system comprising:
one or more processors;
a memory coupled to at least one of the processors;
a set of computer program instructions stored in the memory and executed by at least one of the processors in order to perform actions of:
sending, from a first device to a second device, an initial I/O request comprising a request to confirm whether the second device supports latency simulation, and wherein the first device and the second device are a server, a controller, or a switch;
based on the second device supporting latency simulation, the second device sending to the first device, a latency support confirmation;
in response to receiving the latency support confirmation, the first device building, an I/O frame, comprising an I/O command comprising a read data or a write data, and a latency period, that is based on a calculated latency duration; and
the first device sending the I/O frame to the second device upon the expiration of the latency duration.

5. The computer system according to claim 4, wherein said latency duration is calculated by said first device using a function that outputs a statistical distribution.

6. The computer system according to claim 5, wherein said statistical distribution comprises a function selected from a group consisting of:
an exponential probability density function, said latency delay representing said exponential probability density function by an expected value of said latency delay representing the $63.2^{nd}$ percentile;
an uniform probability density function, said latency delay representing said uniform probability density function by a lower limit and an upper limit of said latency delay;
a Gaussian probability density function, said latency delay representing said Gaussian probability density function by an arithmetic mean representing the 50th percentile, a standard deviation of said latency delay, and the number of standard deviations to be included;
a binary probability density function, said latency delay representing said binary probability density function by a first latency duration and a second latency duration;
a Rayleigh probability density function, said latency delay representing said Rayleigh probability density function by an expected value of said latency delay representing the $63.2^{nd}$ percentile and a shape factor of two; and
a Weibull probability density function, said latency delay representing said Weibull probability density function by an expected value of said latency duration representing the $63.2^{nd}$ percentile, a shape factor, and a latency offset.

7. A computer program product, the computer program product comprising:
a non-transitory storage medium readable by a processing circuit and storing instructions for execution by the processing circuit for performing a method comprising:
sending, from a first device to a second device, an initial I/O request comprising confirmation that the second device supports latency simulation, and wherein the first device and the second device are a server, a controller, or a switch, (7,8);
based on the second device supporting latency simulation, the second device sending to the first device, a latency support confirmation;
in response to receiving the latency support confirmation, the first device building, an I/O frame, comprising an I/O command comprising a read data or a write data, and a latency period, that is based on a calculated latency duration; and
the first device sending the I/O frame to the second device upon the expiration of the latency duration.

8. The computer program product according to claim 7, wherein said latency period is calculated using a function that outputs a statistical distribution.

9. The computer program product according to claim 8, wherein a choice of said statistical distribution function is based on a setting of choice of probability density function, wherein said statistical distribution function comprises:
an exponential probability density function, said latency delay representing said exponential probability density function by an expected value of said latency delay representing the $63.2^{nd}$ percentile;
an uniform probability density function, said latency delay representing said uniform probability density function by a lower limit and an upper limit of said latency delay;
a Gaussian probability density function, said latency delay representing said Gaussian probability density function by an arithmetic mean representing the 50th percentile, a standard deviation of said latency delay, and the number of standard deviations to be included;
a binary probability density function, said latency delay representing said binary probability density function by a first latency duration and a second latency duration;
a Rayleigh probability density function, said latency delay representing said Rayleigh probability density function by an expected value of said latency delay representing the $63.2^{nd}$ percentile and a shape factor of two; or
a Weibull probability density function, said latency delay representing said Weibull probability density function by an expected value of said latency duration representing the $63.2^{nd}$ percentile, a shape factor, and a latency offset.

* * * * *